(12) United States Patent
Southard et al.

(10) Patent No.: US 7,039,505 B1
(45) Date of Patent: May 2, 2006

(54) METHOD FOR DIGITAL TRANSMISSION AND DISPLAY OF WEATHER IMAGERY

(75) Inventors: David A. Southard, Bedford, MA (US); Lowell F. Bell, Boston, MA (US); Michael A. Aucoin, North Andover, MA (US); Frédéric Gouin, Concord, MA (US); Theodore H. Cannaday, Jr., Staley, NC (US)

(73) Assignee: Avidyne Corporation, Lincoln, MA (US)

( * ) Notice: Subject to any disclaimer, the term of this patent is extended or adjusted under 35 U.S.C. 154(b) by 117 days.

(21) Appl. No.: 10/622,382

(22) Filed: Jul. 18, 2003

Related U.S. Application Data

(60) Provisional application No. 60/397,591, filed on Jul. 19, 2002.

(51) Int. Cl.
*G01C 23/00* (2006.01)

(52) U.S. Cl. .......................... 701/3; 701/200; 701/202; 340/945; 340/971; 342/26 A

(58) Field of Classification Search .................. 701/3, 701/200, 202; 702/3; 340/995.12, 945, 340/971; 342/26 A
See application file for complete search history.

(56) References Cited

U.S. PATENT DOCUMENTS

| | | | | |
|---|---|---|---|---|
| 4,642,775 A | * | 2/1987 | Cline et al. ................. 701/200 |
| 5,265,024 A | * | 11/1993 | Crabill et al. ............... 701/200 |
| 5,999,882 A | * | 12/1999 | Simpson et al. ................ 702/3 |
| 6,014,606 A | * | 1/2000 | Tu .............................. 701/200 |
| 6,043,756 A | * | 3/2000 | Bateman et al. ............ 340/945 |
| 6,154,143 A | * | 11/2000 | Robinson ..................... 340/601 |
| 6,199,015 B1 | * | 3/2001 | Curtwright et al. ......... 701/213 |
| 6,289,277 B1 | * | 9/2001 | Feyereisen et al. ......... 701/202 |
| 6,339,747 B1 | | 1/2002 | Daly et al. |
| 6,381,538 B1 | * | 4/2002 | Robinson et al. ........... 701/211 |
| 6,650,972 B1 | * | 11/2003 | Robinson et al. .............. 701/3 |
| 6,828,922 B1 | * | 12/2004 | Gremmert et al. .......... 340/949 |
| 2002/0039072 A1 | * | 4/2002 | Gremmert et al. .......... 340/945 |
| 2002/0146176 A1 | * | 10/2002 | Meyers ....................... 382/218 |
| 2003/0086605 A1 | | 5/2003 | Doner |

OTHER PUBLICATIONS

"GARMIN Delivers Weather Data to the Cockpit", Dec. 13, 1999, <http:www.echoflight.com/99-12-13.html>.

* cited by examiner

*Primary Examiner*—Thomas G. Black
*Assistant Examiner*—Eric M Gibson
(74) *Attorney, Agent, or Firm*—Hamilton, Brook, Smith & Reynolds, P.C.

(57) ABSTRACT

A method for creating minimal data representing a source image is presented. The source image is divided into a grid of cells. A color is selected for each cell corner based on sampling an area defined by the cell corner. An indication of the selected color is stored in an array dependent on the co-ordinates of the cell corner in the source image.

8 Claims, 9 Drawing Sheets

METHOD FOR DIGITAL TRANSMISSION AND DISPLAY OF WEATHER IMAGERY

RELATED APPLICATION

This application claims the benefit of U.S. Provisional Application No. 60/397,591, filed on Jul. 19, 2002. The entire teachings of the above application are incorporated herein by reference.

BACKGROUND OF THE INVENTION

An aircraft pilot needs up to date (timely) information on weather conditions in order to avoid flying through severe weather conditions. Typically, this is provided by displaying weather conditions detected by an airborne weather radar. The weather radar system includes an antenna receiver/transmitter unit attached to the aircraft. The unit emits a concentrated beam of microwave energy. The returned echo indicates the intensity of detected targets. The detected intensity is displayed as color coded targets depicting echoes on a display (i.e. cockpit monitor). The intensity of the rainfall at a given location is indicated by the color displayed. For example, black represents very light or no precipitation, green represents light precipitation, yellow represents moderate precipitation, red represents heavy precipitation and magenta represents very heavy precipitation.

The airborne weather radar cannot be relied upon at increased distances from the sensor because a radar beam increases in width with increased distance from the sensor. At a large distance the beam is very wide, sometimes on the order of tens of miles. The radar sensor detects a target at a particular distance based on the average intensity of the echo across the full beam width. A typical thunderstorm is only one mile in diameter. Thus, a storm detected within a beam that is 10 miles wide may only return an echo indicating one-tenth the intensity because of intensity averaging over the full beam width. Thus, the intensity is incorrectly represented as green (light storm) instead of showing regions of red (heavy storm). The returned echo is misleading because it does not depict the real intensity of the weather ahead of the aircraft.

Weather providers provide more accurate and detailed images of weather conditions than can be derived from airborne weather radar. Systems for downlinking these images from satellites, for display on monitors in the cockpits of aircraft are available. For example, the Orbcomm network provides a request/reply service, which downloads from a satellite the latest weather uploaded from a ground station to the satellite in reply to a request. However, weather graphics files are very large and a link to the aircraft cockpit from a satellite is slow. Thus, it takes a long time to download the weather conditions from the satellite. For example, the bandwidth of a link from a satellite in the Orbcomm network of Orbital Sciences satellites is 4800 bits per second (bps).

Typically, the minimum data to reconstruct an image is downlinked to minimize the bandwidth. This results in a very low-resolution image comprising a series of linked blocks, which does not accurately represent the shapes of weather features.

SUMMARY OF THE INVENTION

In the present invention, minimal data is created to represent a source image reducing the bandwidth required for transmitting the source image and allowing a high-resolution image to be generated. Minimal data representing a source image is created by first dividing the source image into a grid of cells. Next, a color is selected for each cell corner based on sampling an area defined by the cell corner, and an indication of the selected color is stored in an array dependent on the co-ordinates of the cell corner in the source image.

In one embodiment, a region of critical importance in the source image may be marked in the source image. The region of critical importance is dependent on flight path and current position. A dimension of a cell is dependent on distance of the cell from the region of critical importance. Each cell in the grid of cells may be a square. Upon detecting a plurality of colors at a cell corner, the color value of highest value is selected for the cell corner.

An image is generated from the minimal data by populating an array for the image by reading color values of cell corners from a received data stream and assigning the values to the array. Source cells used to create the minimal data are duplicated and the cells are rendered dependent on the received values for the corners of the cell. Cells are rendered by testing each cell for transition zones and upon detecting a transition zone, computing temporary mid-points and treating the cell as being divided. A color value is selected for a cell based on the result of an interpolation function performed based on the color values of the corners of the cell.

A source image is transmitted and displayed by selecting an array of sample points defining a voronoi region in a source image. A representative value from image pixels in each voronoi region is computed and the representative values are quantized then compressed. The compressed values are transmitted over a communications medium to a display system. The sample points are reconstructed in the display system, and the source image is reconstructed based on the array of sample points. The compression may be performed using a lossless compression algorithm. The lossless algorithm may be a 2.33 bit compression algorithm, a one-byte run length encoding compression algorithm or a knowledge based compression algorithm.

Graphical weather images are delivered through a satellite to an aircraft by automatically transmitting an updated graphical weather image to the aircraft based on flight plan for display. The updated weather image may be transmitted upon detecting a reportable or relevant weather condition. The automatic manner of transmitting weather images to an aircraft and generating images (from minimal data) for display in the aircraft is without pilot request (i.e. not a request/reply service).

Graphical weather images are delivered through a satellite to an aircraft by determining an expected position of the aircraft based on a flight plan and automatically transmitting to the aircraft an updated graphical weather image covering the expected position of the aircraft. The updated image may be predictive dependent on flight plan and position or based on changes in a source weather image. The graphical weather image may be created by dividing a source image into a grid of cells. A color is selected for each cell corner based on sampling an area defined by the cell corner. An indication of the selected color is stored in an array dependent on the co-ordinates of the cell corner in the source image.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
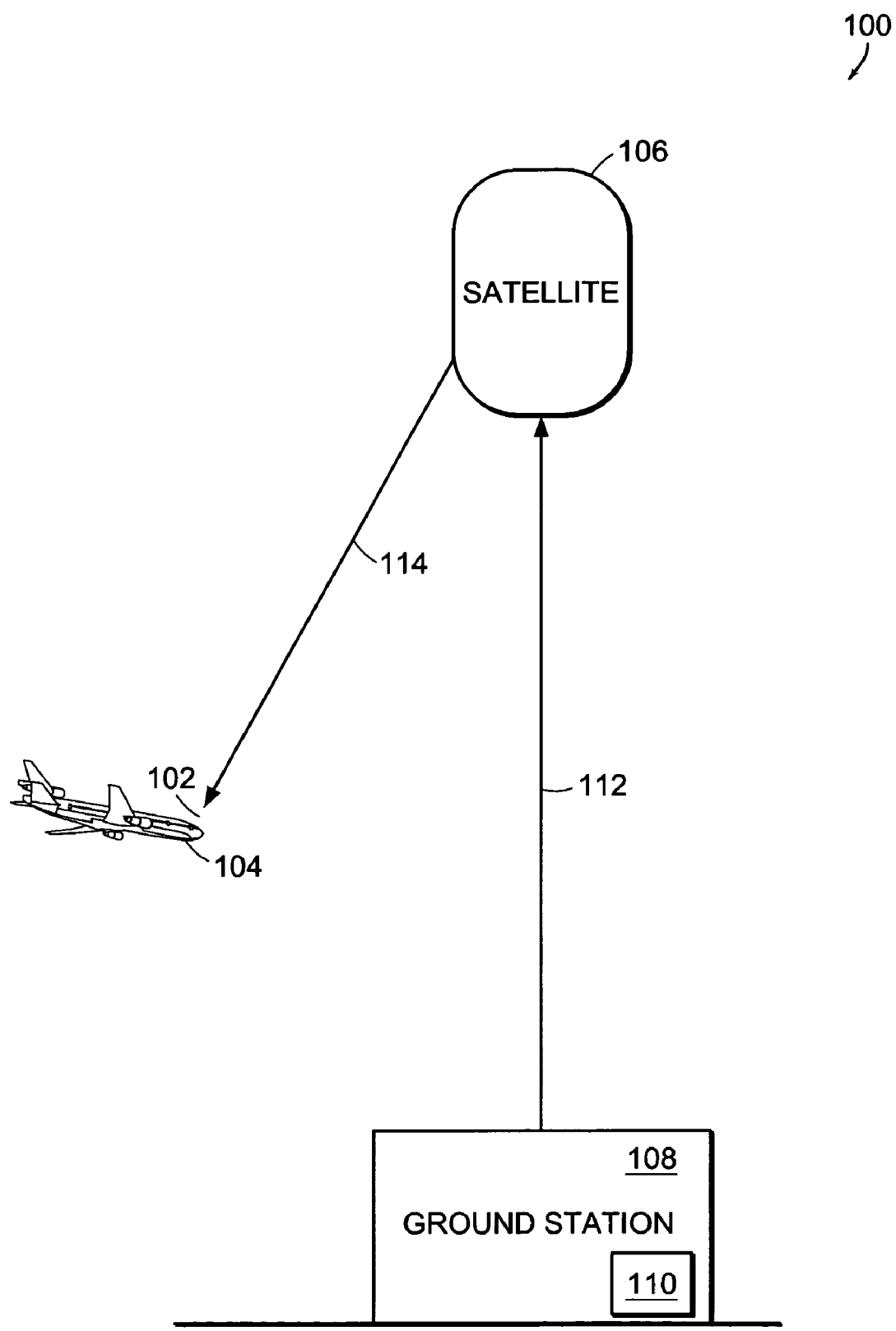
FIG. 1 illustrates a weather imagery system which compresses a source weather image for uploading to a satellite and a system in the aircraft for reconstruction of the downlinked weather image according to the principles of the present invention.

FIG. 1 illustrates a weather imagery system 100, which compresses a source weather image 110 for uploading to a satellite 106, and a system 104 in the aircraft 102 for reconstruction of the downlinked weather image according to the principles of the present invention. The source weather image 110 is computed based on where the system 100 expects the aircraft 102 to be along a flight plan when it receives the weather image. Thus, the downlinked weather image (over 114) is used for long-range flight planning. Typically, it takes five to ten minutes to download the weather image from a ground station 108 through the satellite 106 to the aircraft 102.

The system 100 uses a position model to coordinate weather data and the position of the aircraft 102. The aircraft 102 sends position, ground track and ground speed to the ground station 108 so that the aircraft's location can be predicted when the next weather update is scheduled. The weather updates occur on a pilot configurable timer—the system 100 is not of a request/reply configuration. The position model is updated when the actual position of the aircraft 102 has diverged significantly from the model (on the order of speed * 5 min).

It is inherently disclosed that the system provides hands-free weather update with no additional work by the pilot. The system 100 begins by sending the last known good position to the ground station 108, before all other systems are operational and current GPS position is acquired. This allows the fastest possible start of a session and begins the automatic weather report or update deliveries based on that position. There is no pilot action required, and the weather is tailored according to the last settings used. Once this first weather report/update is delivered and presented, the system will then automatically send current pilot configuration, flight plan and position to the ground station 108. The next weather update will then match the route of the aircraft and automatically update periodically according to current pilot preferences.

No request/reply is required to obtain the new set of weather information, the ground station 108 will send the custom weather and advisories up until the end of the session. Complete flights can be accomplished with "hands free" operation with no pilot intervention required to get the relevant weather en route and at the destination airport. Relevant weather is delivered automatically based upon: pilot preferences on the unit, pilot preferences on a World Wide Web ("WWW") page, flight plans, pilot intent, current position and ground track, "maneuvering" mode, and severity of weather. The service is tailored to the particular aircraft position with different images transmitted to each aircraft (i.e. not a broadcast service). Deviations from the flight plan are covered using position and ground track updates when threshold values are exceeded. A "maneuvering" mode is automatically entered during holds and VFR maneuvers, which presents the surrounding area weather and advisories.

The presentation of the datalink information (downlinked weather image) is completely and seamlessly integrated with the moving map, flight plan information, and nearest airports. No additional pilot workload or pilot action is required to get the additional awareness provided by the datalink information. At the end of flight, the last known good position is sent to the ground station 108 and stored in a Satellite Communicator for the next session starting point. The session is then terminated by the ground station 108 and the automatic updates to the aircraft 102 through the satellite 106 are stopped.

The datalink system 100 uses flight plan following to calculate projected position for each active aircraft 102. A dynamic position model is maintained both in the aircraft 102 and in the ground station 108 for each active session. The model uses the most recently reported flight plan, position and ground speed as seed parameters. The Network Operations Center (NOC) uses the model to approximate the position of each aircraft 102 at the time of its next scheduled update. Weather (and other data-linked data) is then compiled such that the projected position serves as the focus of the data to be delivered. The type and amount of data is determined by pilot preferences and severity of the weather. These preferences may be modified on board the aircraft 102 through the airborne user interface or on the ground through a web page. The preferences (data indicating such) are non-volatile so a pilot need never change them.

The predictive capabilities of this system are enabled when the pilot logs a flight plan with the NOC prior to flight. The pilot may also set preferences and select optional services.

The NOC may connect the aircraft with personalized two-way communications systems, including e-mail, web, paging, and cellular phone networks. For example, text messages sent to the pilot's e-mail or cell phone are forwarded to the NOC and thence to the pilot's aircraft in flight. The NOC may automatically send data, including airport status and imagery, to coordinate with anticipated phases of flight. Conversely, the pilot may enter messages using the cockpit's keyboard that are forwarded to other communications networks.

The NOC may monitor aircraft parameters such as fuel and engine status. As the NOC tracks the actual flight path, it may automatically send position reports, amended flight plans, and predicted arrival times to designated recipients. For example, an air taxi service may use this information to schedule, dispatch and track their fleet.

Just as the NOC is projecting position for each aircraft, it can also calculate and project precipitation patterns. This projection is based on accumulation of precipitation imagery. Sequential images are compared to locate cells and fronts. If any are found, their path and speed is calculated to generate a weather model. The weather model in conjunction with position model, provides a powerful tool to predict weather conflicts. If such a conflict is predicted, the NOC sends notification of the plausible event to the appropriate client Flight Situation Display (FSD).

Some weather imagery products are supplied as images wherein the underlying measurements, such as reflectivity dB (decibels), have been converted to colors. The source weather image 110 can be obtained from meteorological radars placed at various locations. The images are periodically updated. A legend or key relates the colors to the original measurement. For example, in the NEXRAD composite reflectivity product, black represents reflectivity of 0–5 dB, medium gray represents reflectivity of 5–10 dB, white represents reflectivity of 70–75 dB, and purple represents reflectivity of >75 dB. The color levels in the source data are not always uniformly distributed because they are chosen for uniform visual presentation. Furthermore, the original units are not always decibels. Velocity (knots), signal-to-noise ratio (SNR), and probability (percent) are also used.

Figure 2A:
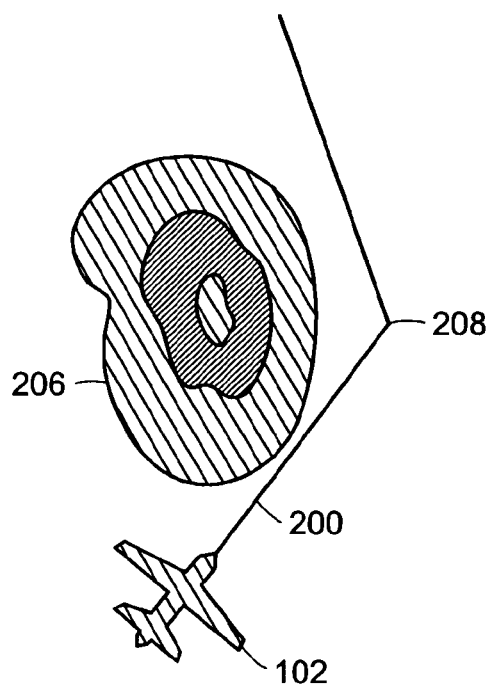
FIGS. 2A–2C illustrate a weather model conflict scenario.
Figure 2C:
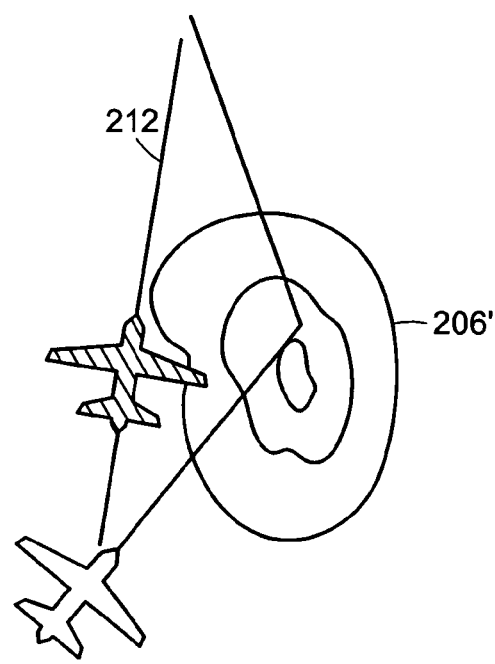
Figure 2B:
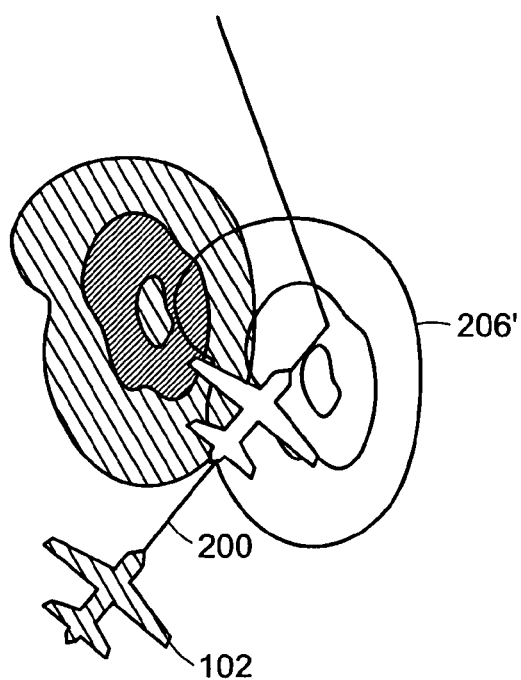

FIGS. 2A–2C illustrate a weather model conflict scenario. FIG. 2A illustrates a weather cell 206 present in the bend 208 of a dog-leg along a flight plan 200.

FIG. 2B illustrates a conflict one hour out bound based on a prediction provided by position and weather models (i.e. the likely path of weather). The weather cell 206 shown in FIG. 2A is predicted to move to the location depicted by weather cell 206'. As shown in FIG. 2B, if the aircraft 102 continues to travel along the flight path, the aircraft 102 will travel through the weather cell 206'.

FIG. 2C illustrates an alternate route 212 to avoid the predicted weather cell 206'. Based on the predicted location of weather cell 206' as shown in FIG. 2B, the pilot requests an alternate route 212 to avoid predicted weather cell 206'.

Returning to FIG. 1, in the present invention, display system 104 presents digital weather imagery. The source weather image 110 is a high resolution image which includes more information than is required to navigate aircraft. Thus, not all of the information in the weather image 110 must be downlinked to the aircraft 102. The information in the source weather image 110 is reduced to provide the minimum necessary data to reconstruct the image after the downlink (over 114), so that the reconstructed image provides sufficient information to navigate. The information in the source weather image 110 is reduced so that no useful information is lost.

Sixteen colors may be used on a source weather image 110 provided by a weather service. Typically, only five of the sixteen colors are used to depict precipitation levels on a weather image used for navigation. Thus, the source weather image 110 provides more colors than are required for a weather display in an aircraft 102. The five colors used in a preferred embodiment of the weather image are black (no precipitation), white (absence of information), red, yellow, green, magenta, blue and pink.

Prior to downlinking the weather image to the aircraft 102 through the satellite, the source image 110 is converted from color and intensity values to engineering units. The engineering units represent color and intensity values. The conversion is performed by means of a reverse quantization operation using the color key from the weather product specification. The term "engineering units" generalizes the units used for the original measurement.

The data is encoded (and decoded) to preserve space without losing accuracy. For example, the color "dark magenta" is converted from RGB (128,0,128) to some arbitrary index, for example, '4', that has been agreed upon by sender (ground station 108, satellite 106) and receiver (aircraft system 104). This also allows the receiver to render the resultant image in an entirely different color scheme than the original, if so desired.

The image data is transformed back to the units of the original measurement prior to manipulation. By converting to units of the original measurement, the original information is preserved as best as possible. Quantization steps that are a part of the compression process assume a linear metric space, which is not the case with color-scale data because color is a display artifact, not an attribute of the original information. If color levels are assigned too early, subsequent compression steps degrade the contours. Any number of colors can be used in the final display, which enhances the quality and visual impact of the presentation.

Figure 3:
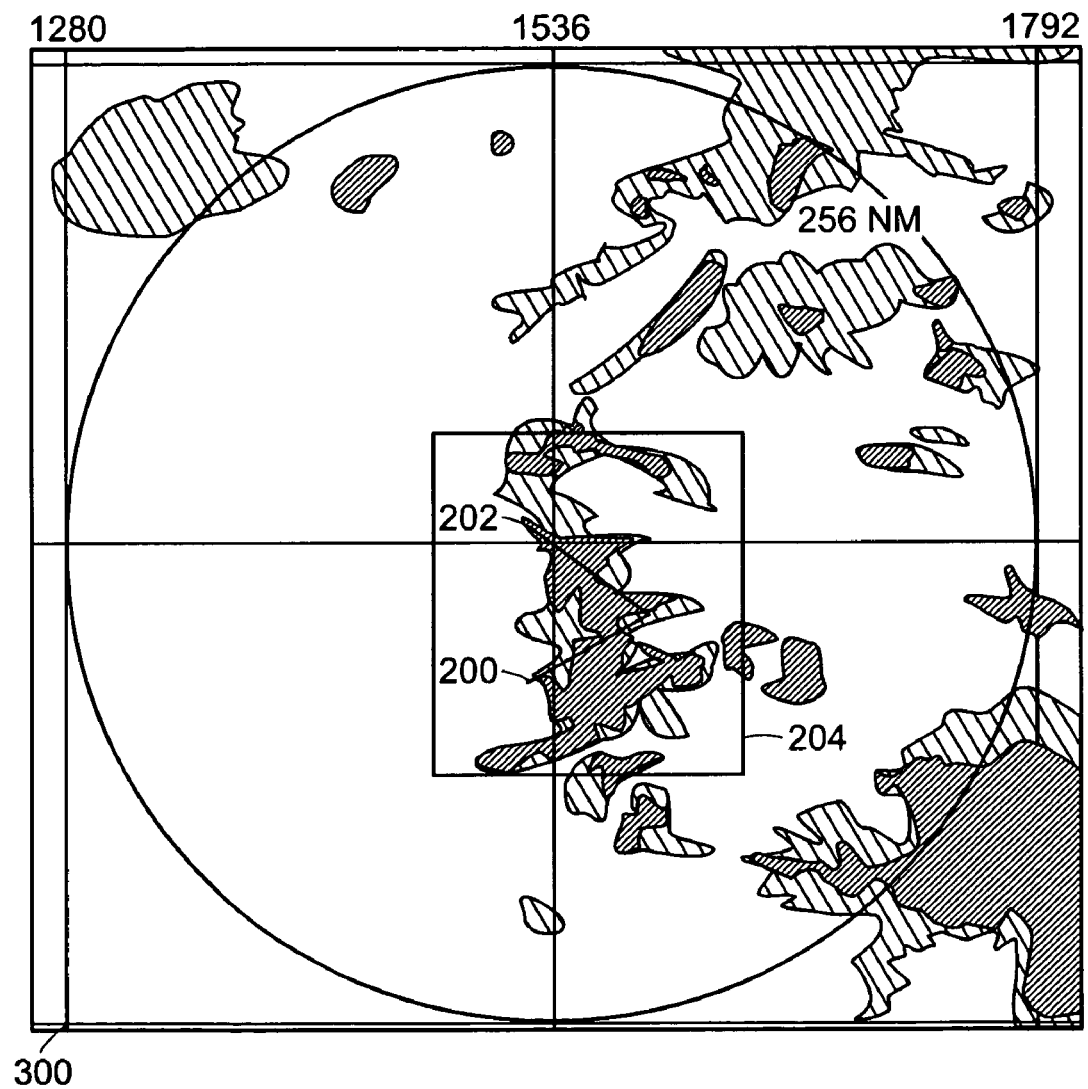
FIG. 3 illustrates the source weather image at 256 nautical miles with a grid dividing the image into four cells.

FIG. 3 illustrates the source weather image 110 at 256 nautical miles with a grid dividing the image into four cells. The source weather image 110 is an array of pixels. The flight plan is represented by line 200. The current position of the aircraft is represented by dot 202 and rectangle 204 depicts a minimum bounding rectangle of a 50 Nautical Mile (NM) radius around the flight plan 200.

Instead of transmitting data for each pixel in the source weather image 110 through the satellite 106 to the aircraft 102, a predetermined array of sample points covering a geographical area of interest in the source weather image 110 is defined. In one embodiment, the sample array is a rectangular grid; however other grids can also be used, for example, triangular, hexagonal or quasi-random sample arrays. The sample points define Voronoi regions in the source image 110. A Voronoi region of a site is a set of points closer to a site than any other site.

In one embodiment, the down linked data for a NEXRAD image includes a flight-plan identifier, a reference position and a compressed set of 3 bit values. The flight plan identifier and reference position ensure that the grid generated on the aircraft 102 side uses the same information as the ground side did when it generated the data. The downlinked data also includes a compressed bit stream that is used to populate the vertices of a base grid as the cell structure defined by the grid is recursed.

In another embodiment, regions of the source image 110 are categorized according to importance. The source-image 110 is sampled such that regions of highest criticality are reproduced identically and regions of lower importance are reproduced with lower accuracy. The resultant image is rendered using bi-linear interpolation which removes pixilated effects from the source image 110 and ensures that there are no visual artifacts created by transitioning between resolutions.

Minimal data representing the source image 110 is created as follows. First, an array that can store each pixel of the source image 110 is created. The array is initialized by populating with "no-data" values. Next, regions of the source image 110 are marked as being of critical importance (the flight plan 200 and associated radius define the critical areas). Then, the source image 110 is divided into a grid of square cells 300, four of the cells are shown in FIG. 3. With one pixel representing 1 NM, each of the four cells 300 has 256 pixels on each side.

After the initial division of the source image into four cells, each of the four cells 300 may be further subdivided. To determine whether a cell 300 is to be subdivided, each cell 300 is tested for proximity to the critical region (as marked/indicated in prior steps) to determine if it should be divided into four smaller cells. The proximity tests are performed recursively on smaller cells until the cell size has reach a minimum. The minimum cell size is the size of one pixel in the source image 110.

Figure 4:
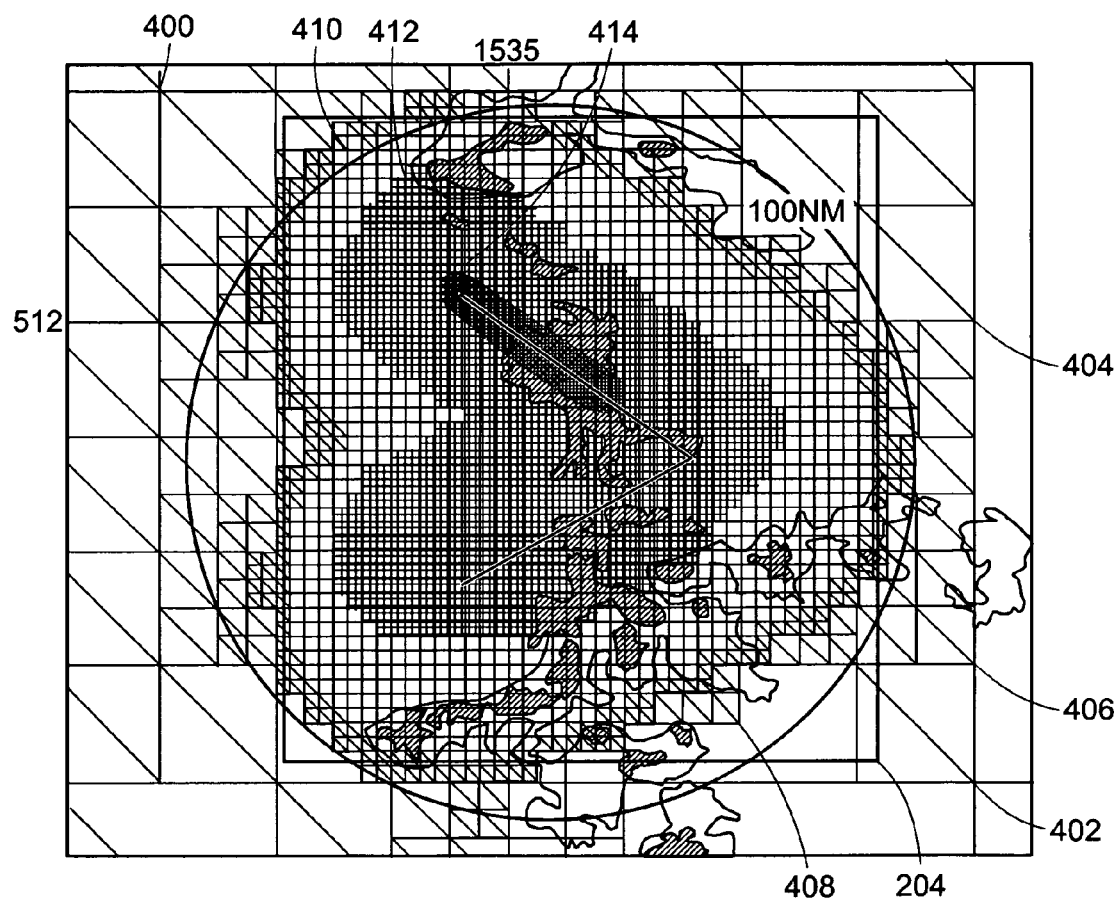
FIG. 4 illustrates the source image divided into cells of different dimensions based on proximity to regions of critical importance.

FIG. 4 illustrates the source weather image at 100 NM divided into cells of different dimensions based on proximity to the critical region. The length of the sides of each cell is dependent on the proximity of the cell to the flight plan 200 (grey, angled lines in the center of the image) and to the current position 202. As shown in FIG. 4, the 1 NM cells are not present at distances greater than 75 NM from the flight plan 200 and the cell size increases with increased distance from the flight plan 200.

Cells of different dimensions (64 NM cell 402, a 32 NM cell 404, a 16 NM cell 406, an 8 NM cell 408, a 4 NM cell 410, a 2 NM 412 and a 1 NM cell 414) dependent on distance from the flight plan 200 and current position are shown in FIG. 4. The 1 NM is the minimum cell in an embodiment in which the source image has a resolution of one pixel per Nautical Mile (NM).

After the source weather image 110 has been divided into cells of different sizes dependent on distance from the critical region, the area defined by each corner of all "active cells" is sampled to determine a color to use to represent the corner. Active cells are undivided cells that are within a region of the source image 110 to be transmitted. The area of pixels sampled is a square defined by the corner of the active cell as the center-point and each edge of the square (area of pixels) to be sampled is the same length as an edge of the undivided cell. In one embodiment, the color is determined by weighted cumulative sampling. In an alternative embodiment, the color can be determined by color averaging and maxima. The location for storing the sample color for a cell in the array is determined by the x-y coordinate of the cell corner.

Typically, each corner defines four cells. If some of the cells are of different resolutions, the color of highest value takes precedence. For example, in a weather display system, red takes precedence over yellow because red indicates a higher intensity of precipitation.

Figure 5:
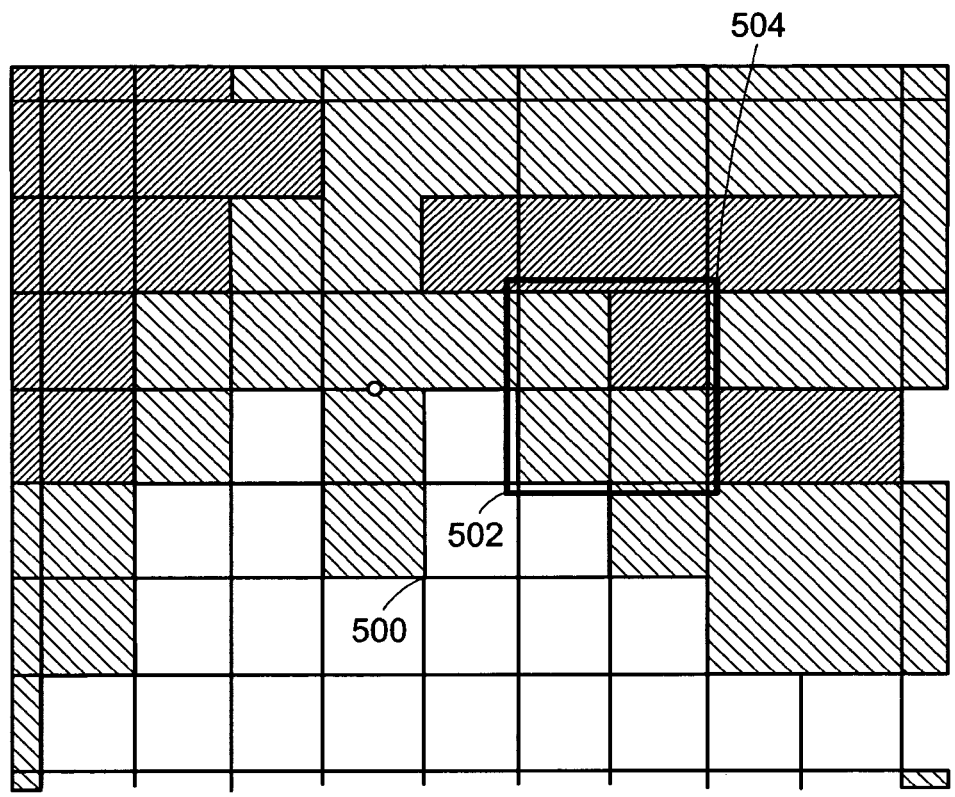
FIG. 5 illustrates a cell depicting the sampling area for a point, which defines the lower left corner of a cell.

As shown in FIG. 5, square 500 depicts the sampling area for the point 502 which defines the lower-left corner of cell 504. The sample color for point 502 is stored in the array at a location in the array determined by the x-y coordinate of the lower left corner of cell 504. Most locations in the array are value-less but a large array is used such that each respective location in the array identifies a position of a pixel in the source image 110.

Figure 6:
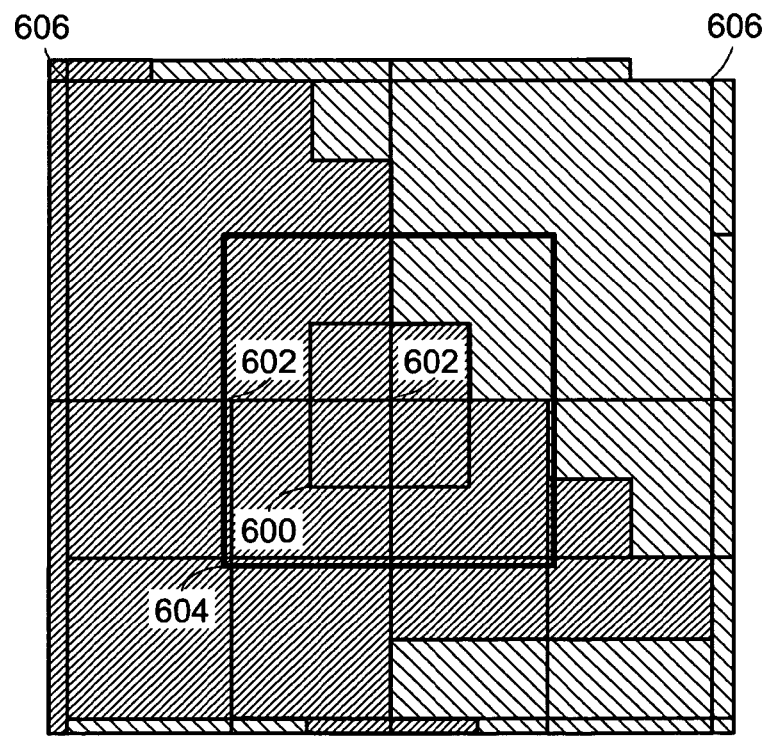
FIG. 6 illustrates sampling a cell while assigning values to cells.

As shown in FIG. 6, square 600, is sampled while assigning values for cells 602. Square 604 is sampled while assigning values for cells 606. A representative value is computed from the set of source image pixels that lie within each Voroni region. In one embodiment, the maximum value (in engineering units) is selected. However, selection criteria such as the mean, weighted mean, median, minimum or other criteria may be used for various applications. After the representative value is computed, each sample point is quantized to a precision determined by the display visual requirements. In one embodiment of the invention, five to eight quantization levels are used. However, the number of quantization levels can be selected to adjust and trade-off visual accuracy versus message size. The quantization method can be truncation or rounding to the nearest of the levels to be displayed.

The quantized representative values are compressed prior to transmitting to the satellite using compression algorithms described below. The compression algorithms include 2.33 bit compression, one-byte RLE compression, adaptive combinations and knowledge-based compression. These compression algorithms are all lossless, an important consideration for the transmission of flight-safety-critical data.

Figure 7:
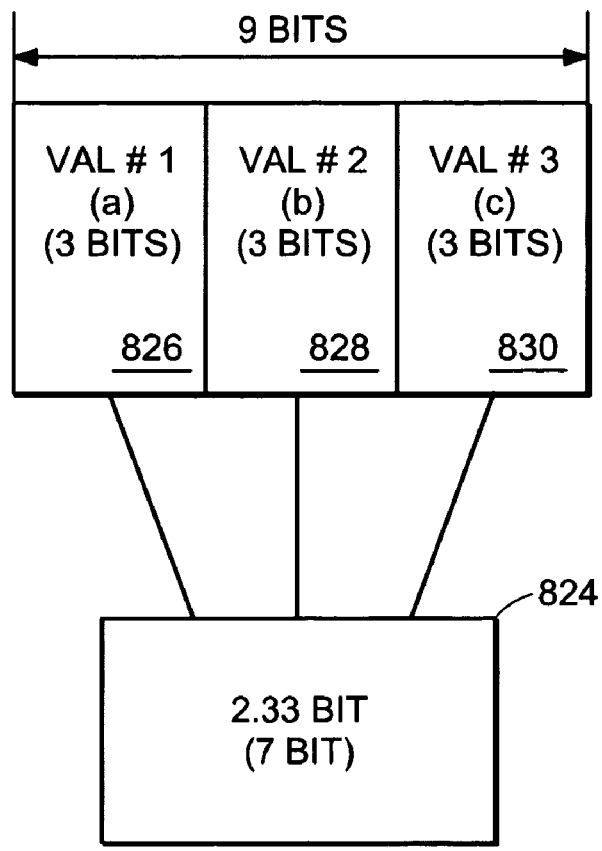
FIG. 7 is a block diagram illustrating compression achieved by the 2.33 bit compression algorithm.

FIG. 7 is a block diagram illustrating compression achieved by the 2.33 bit compression algorithm. The 2.33 bit compression algorithm is used to compress reduced-symbol-set weather data, including Graphical METAR (Aviation Meteorological Report) data, before transmission from the ground to the aircraft. METAR is the international standard code format for surface weather observations for aviation. The acronym roughly translates from French as Aviation Routine Weather report. As shown in FIG. 7, with this arithmetic compression algorithm, three (3) 5-level values 826, 828, 830 are packed into a 7-bit block 824. This is possible based on the knowledge that with 3 parameters (a, b, c) each having 5 possible values each there are $5^3$, or 125, possible combinations, which can be represented in 7 bits (128 possible values). Note that this saves 22% of the space that would be required if the parameters (a, b, c) were individually stored with each parameter having 3 bits (for a total of 9 bits).

These "2.33" bit values, each representing 5 levels, are encoded and decoded using the following formulae. Three parameters are packed into 7 bits, which yields 125 (53) possibilities (the last 3 are not used). If desired for speed, a look-up table can be created for the 125 possible values. Encoding/decoding formulae follow, with a representing the highest-order value and c representing the lowest-order value.

Encoding three parameters (a, b, c) each having 5 possible values into a single 7-bit value (X):

$$X = a*25 + b*5 + c;$$

Decoding single 7-bit value (X) into three 5-level values:

$$a = X/25;$$

$$b = (X - 25*a)/5;$$

$$c = X - 25*a - 5*b;$$

Thus, there is a 22% saving over using 3 bits per value and a 71% saving over using one byte per value.

This algorithm can also be used to compress NEXRAD radar image data. NEXRAD is a network of radar systems deployed throughout the United States and some overseas locations which provides general weather images. The typical range of each NEXRAD radar is 250 nautical miles. It is inherently disclosed that the system gives coverage in remote areas.

Figure 8:
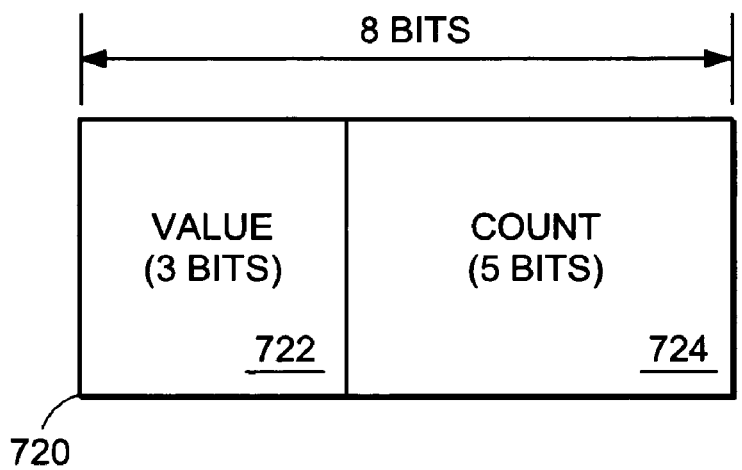
FIG. 8 is a block diagram illustrating data compressed using the one-byte RLE compression algorithm

FIG. 8 is a block diagram illustrating data compressed using the one-byte RLE compression algorithm. The one-byte RLE compression algorithm is an adaptation of the well-known Run-Length Encoding technique. With this lossless algorithm, efficient compression of NEXRAD-specific symbols are attained. One byte (8 bits) 720 is used for each block of data, with the byte divided into 3 bits representing the value 722 or color in the case of a NEXRAD image (8 possible values), and the remaining 5 bits representing the count 724 for that value (up to 32 counts). In the case of NEXRAD, the count represents the bin count, or pixel count, of the radar image. The characteristic of NEXRAD images means that it is rare to need more than 32 counts to represent the run-length of a single color therefore this is an efficient compression algorithm. Where there is a large image with one color (such as a near-empty image) it pays to switch to Two-Byte RLE, where again, colors are represented by 3 bits, but the count is represented by 13 bits, allowing up to 8192 counts. The compression gain to switch from One-Byte RLE to Two-Byte RLE is minimal, however, due to the small compressed size of any image that benefits from such a switch.

While it might first be assumed that 5 bits would only allow representation of 31 counts, in this case it allows 32 counts since 0 counts is not a valid value (there will never be a case of 0 counts). This algorithm always adds one (1) to the included count, allowing valid values of 1–32 in 5 bits.

The One-Byte RLE bit pattern is illustrated in FIG. 8 and also in Table 1 below

|v2|v1|v0|c4|c3|c2|c1|c0| where:
  v2:v0=3-bit value (8 possible values)
  c4:c0=5-bit count (32 possible values)

Table 1

The Two-Byte RLE bit pattern is illustrated in Table 2 below:

|v2|v1|v0|c12|c11|c10|c9|c8|c7|c6|c5|c4|c3|c2|c1|c0| where:
  v2:v0=3-bit value (8 possible values)
  c12:c0=13-bit count (8192 possible values)

Table 2

Symbols-to-bytes compression ratios, though dependent on the complexity of the source symbol data, are typically greater than 10:1.

The adaptive combinations algorithm enables use of adaptive combinations of compression techniques 'on top of each other' to attain a maximum compression percentage before transmission to the airborne client (system 104). For example, One-Byte RLE can be used first, then the resulting compressed data is passed through an Adaptive Huffman compressor, resulting in very high compression ratios. The Adaptive Huffman Compression is a compression algorithm well-known to those skilled in the art. The 'Adaptive' nature of this technique means that several combinations can be tried by the ground station 108 before the weather data is sent, and the most efficient combination is then chosen for maximum compression. Then, an identification of the combination used is transmitted along with the compressed data to the receiver (system 104) so it can use the same (de)compression schemes in reverse order, to attain lossless compression/decompression and the minimum message size.

Various compression techniques are used in Adaptive Combinations. These include the generic techniques such as Huffman, Adaptive Huffman, and Lempel-Ziv-Welch (LZW) well-known to those skilled in the art, along with the RLE algorithms (One-Byte RLE and Two-Byte RLE). Typically, the One-Byte RLE and Adaptive Huffman combination gives the best compression ratio.

For the One-Byte RLE and Adaptive Huffman combination, Symbols-to-bytes compression ratios of greater than 20:1 are generally achieved.

The knowledge-based compression algorithm involves packing all values to be transmitted by using the exact minimum number of bits required for the data, and no more. It requires specific knowledge of the number of possible values that each data field may take, and encodes those values into the minimum bit size.

This technique eliminates bit-waste in the weather data transmission protocols, but does not play a role in the compression ratio results mentioned above. The compressed representative values are transmitted using a communications medium. In one embodiment, the communications medium is a link 114 to a satellite 106.

A receiver 104 receives the compressed representative values and decompresses the compressed representative values to obtain the representative values. Next, the receiver 104 rescales the representative values to the original values using the same coding method used by the transmitter 108 and then the receiver 104 reconstructs the sample array.

Data is only defined for the corners of each cell not the interior. Thus, less data is transmitted because only the corners of each cell are transmitted and each corner is only transmitted once. Each type of data is rendered separately.

The image is reconstructed using an interpolation function that is first-order continuous. The coefficients of the interpolation function are determined mathematically from the boundary conditions of the known sample array configuration and from the reconstructed sample values. In one embodiment, the interpolation function is a simple two-dimensional polynomial $f(x,y)=Ax+By+Cxy+D$, which is suitable for rectilinear arrays. Using such an interpolation function, the recipient can color-code the image values using the same or different presentation standards than the original. However, the visual contours of the reconstructed image are similar to the original.

In alternate embodiments, derivatives of the algorithm can be applied to irregular quadrilaterals. Applying the algorithm to polygons with other than four vertices requires the derivation of an equation that transitions smoothly from one vertex to all others.

Figure 9:
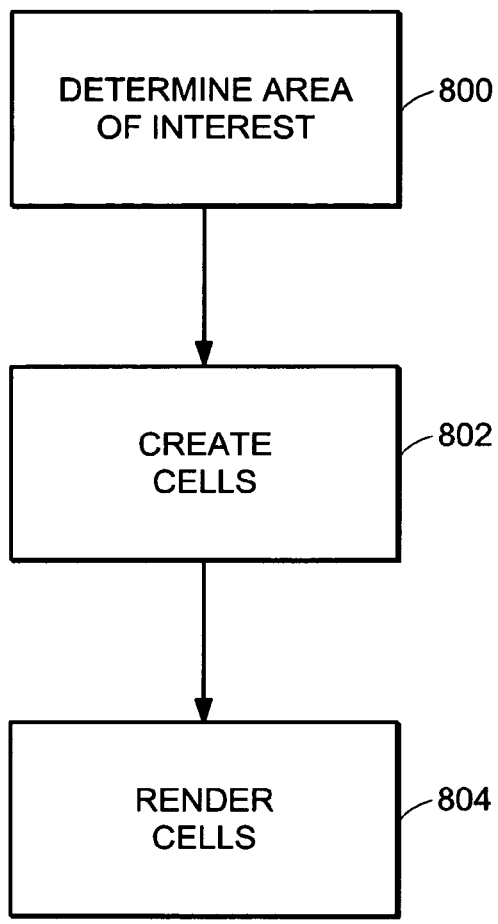
FIG. 9 illustrates a method for reconstructing the downlinked image in the aircraft.

FIG. 9 illustrates a method for reconstructing the down linked image (transmitted over 114) in the aircraft 102. At step 800, the area of interest 204 is determined. The flight plan 200 and associated radius define the area of interest as described in conjunction with FIG. 3. The resultant image is "marked" with the areas of critical importance (flight plan and radius). An array is created large enough to hold the source image 110. The array is populated with "no-data" values. At step 802, cells of varying dimensions are created based on proximity to the critical region as described in conjunction with FIG. 4.

At step 804, the cells are rendered based on sampling the color of the corners of all active cells. The recursive cell division is performed again on the resultant image to duplicate the source-cells. The resultant-cells are walked recursively to apply data to the underlying grid. If the associated value of the underlying grid contains a "no-data" value—one value is read from the source data stream and assigned to the underlying grid. The resultant image is rendered using bi-linear interpolation across cells of varying dimensions. Bi-linear interpolation provides two benefits. The rendering creates a resultant image that removes pixilated effects from the source image and there are no visual artifacts created by transitioning between resolutions.

Figure 10:
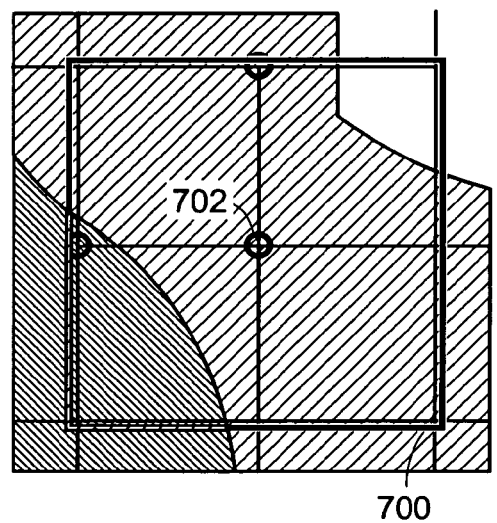
FIG. 10 illustrates additional cells interpolated from existing sample points.

As shown in FIG. 10, to render cell 700, additional sample points 702 are interpolated from existing sample points. The cell 700 is then rendered in quadrants.

Figure 11:
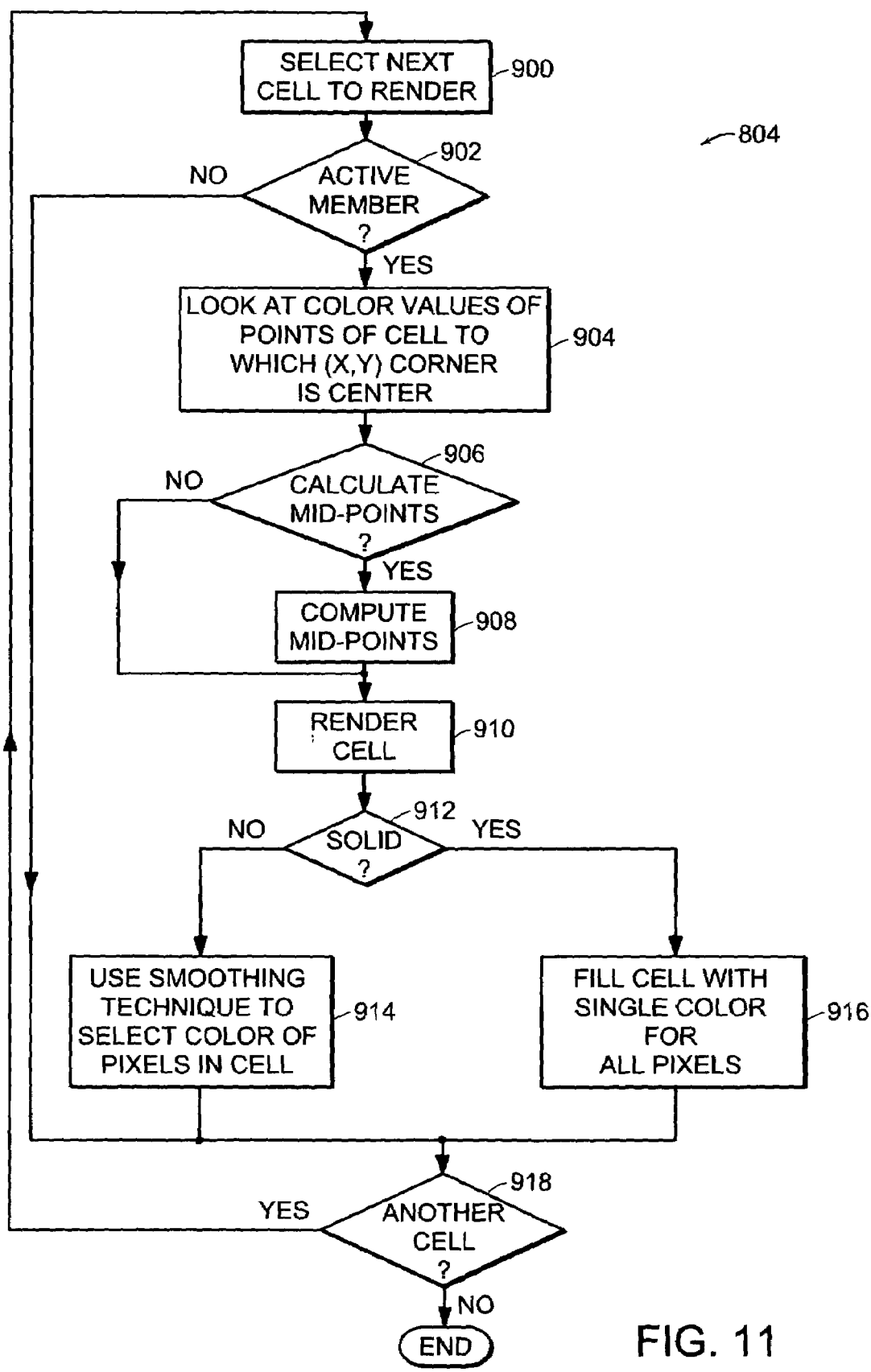
FIG. 11 illustrates the method for rendering cells used in the image reconstruction of FIG. 9.

FIG. 11 illustrates a method 804 for rendering cells. If the associated value of the underlying grid contains a "no-data" value—one value is read from the source data stream and assigned to the underlying grid.

At step 900, a cell is selected for rendering. At step 902, if the cell is active, processing continues with step 904 to render the cell. If the cell is not active, the cell is not rendered and processing continues with step 918. At step 904, the color values of corners of a cell to which the corner of the selected cell is center are checked. At step 906, the cell is tested to see if it occupies a transition zone (determined by mid point values). If the cell occupies a transition zone, processing continues with step 908 to compute additional temporary mid-points. If not, processing continues with step 910. At step 908, temporary mid-points are created and the cell is treated as being divided. At step 910, the cell is rendered. At step 912, the color of pixels in the cell is computed. If all corners are the same color, processing continues with step 916 to fill the cell with a single color for all pixels. If the corners of the cell are different colors, processing continues with step 914 after step 912. At step 914, a smoothing technique is used to select colors for pixels in the cell dependent on the colors of the corners of the cell. Processing continues with step 918. At step 918, if there is another cell to render, processing continues with step 900. If not, processing is complete.

Figure 12:
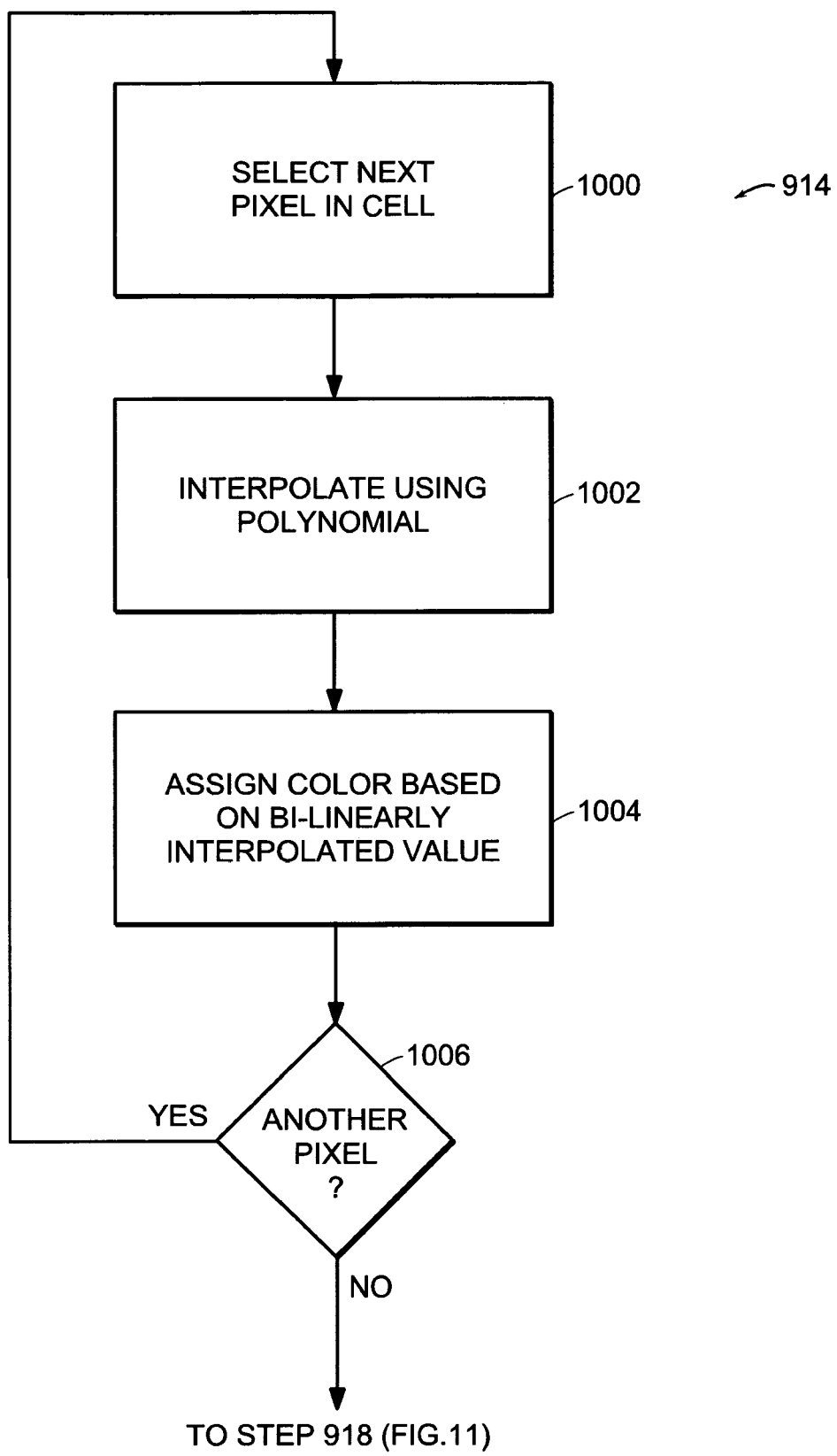
FIG. 12 illustrates a smoothing technique employed at one step in the method of FIG. 11.

FIG. 12 illustrates the smoothing technique of step 914. At step 1000, a pixel in the cell is selected. At step 1002, a color value is selected for the pixel based on an interpolation function. The interpolation function is a two-dimensional polynomial:

$$f(x,y)=Ax+By+Cxy+D$$

where:
x,y is the position of the pixel with respect to the width (in pixels) and depth (in pixels) of the cell
  with x=x-pixel position/width of cell (in pixels)
    y=y-pixel position/depth of cell (in pixels)
  where (0,0) is the upper left hand corner of the cell.
A=f01-f00 where f01, f00 represent colors associated with corners of the cell
B=(f11-f10-(f01-f00)) where f11 and f10 represent colors associated with corners of the cell.
C=f10-f00
D=f00

At step 1004, a color is assigned to the pixel based on the interpolated value. At step 1006, processing continues with step 1000 to process the next pixel in the cell.

The invention has been described for an embodiment for downlinking weather informational data (especially images). However the invention can also be used to downlink any other type of data to an aircraft such as, Temporary Flight Restrictions (TFR) or Special Use Airspace (SUA).

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented method of delivering graphical weather images through a satellite to an aircraft en route comprising the steps of:
    determining an expected position of the aircraft based on a flight plan;
    automatically transmitting to the aircraft an updated graphical weather image covering the expected position of the aircraft; and
    creating the updated graphical weather image by:
        dividing a source image into a grid of cells;
        selecting a color for each cell corner based on sampling an area defined by the cell corner; and
        storing an indication of the selected color in an array dependent on the co-ordinates of the cell corner in the source image.

2. The method of claim 1 wherein the updated graphical weather image is transmitted upon detecting relevant weather.

3. The method of claim 1 wherein the updated graphical weather image is transmitted based on severity of the weather in a source weather image.

4. The method of claim 1, wherein the updated graphical weather image is computed based on the expected position of the aircraft along the flight plan when the aircraft receives the updated graphical weather image.

5. The method of claim 1, wherein an update providing the updated weather graphical weather image occurs based on a pilot configurable timer.

6. The method of claim 1, wherein the aircraft sends position, ground track and ground speed information to a ground station so that the aircraft's location can be predicted when next weather update is scheduled.

7. The method of claim 1, wherein the updated graphical weather image indicates relevant weather and is delivered based upon the severity of weather.

8. The method of claim 1, wherein the aircraft receives a different updated graphical weather image than another aircraft based on the expected position in the flight plan.

* * * * *